(12) United States Patent  (10) Patent No.: US 9,191,494 B1
Chevrier et al.  (45) Date of Patent: Nov. 17, 2015

(54) DEVICE, SYSTEM, AND METHOD FOR PERFORMING ECHO CANCELLATION IN DIFFERENT MODES OF A COMMUNICATION DEVICE

(71) Applicant: CaptionCall, LLC, Salt Lake City, UT (US)

(72) Inventors: Brian Chevrier, Highland, UT (US); Douglas Ryan Herbert, Fishers, IN (US)

(73) Assignee: CaptionCall, LLC, Salt Lake City, UT (US)

( * ) Notice: Subject to any disclaimer, the term of this patent is extended or adjusted under 35 U.S.C. 154(b) by 0 days.

(21) Appl. No.: 14/679,922

(22) Filed: Apr. 6, 2015

(51) Int. Cl.
  *H04M 9/08* (2006.01)
  *H04M 3/00* (2006.01)
  *H04M 3/42* (2006.01)

(52) U.S. Cl.
  CPC .......... *H04M 3/002* (2013.01); *H04M 3/42382* (2013.01); *H04M 3/42391* (2013.01)

(58) Field of Classification Search
  CPC ...................................................... H04M 9/082
  USPC ........................................ 379/406.06, 406.08
  See application file for complete search history.

(56) References Cited

U.S. PATENT DOCUMENTS

| | | | |
|---|---|---|---|
| 5,909,482 A | 6/1999 | Engelke | |
| 5,974,116 A | 10/1999 | Engelke et al. | |
| 5,978,654 A | 11/1999 | Colwell et al. | |
| 6,075,841 A | 6/2000 | Engelke et al. | |
| 6,075,842 A | 6/2000 | Engelke et al. | |
| 6,233,314 B1 | 5/2001 | Engelke | |
| 6,307,921 B1 | 10/2001 | Engelke et al. | |
| 6,493,426 B2 | 12/2002 | Engelke et al. | |
| 6,504,910 B1 | 1/2003 | Engelke et al. | |
| 6,510,206 B2 | 1/2003 | Engelke et al. | |
| 6,549,611 B2 | 4/2003 | Engelke et al. | |
| 6,567,503 B2 | 5/2003 | Engelke et al. | |
| 6,594,346 B2 | 7/2003 | Engelke | |
| 6,603,835 B2 | 8/2003 | Engelke et al. | |
| 6,748,053 B2 | 6/2004 | Engelke et al. | |
| 6,882,707 B2 | 4/2005 | Engelke et al. | |
| 6,885,731 B2 | 4/2005 | Engelke et al. | |
| 6,934,366 B2 | 8/2005 | Engelke et al. | |
| 7,003,082 B2 | 2/2006 | Engelke et al. | |
| 7,006,604 B2 | 2/2006 | Engelke | |
| 7,164,753 B2 | 1/2007 | Engelke et al. | |
| 7,319,740 B2 | 1/2008 | Engelke et al. | |
| 7,555,104 B2 | 6/2009 | Engelke | |
| 7,660,398 B2 | 2/2010 | Engelke et al. | |

(Continued)

*Primary Examiner* — Alexander Jamal
(74) *Attorney, Agent, or Firm* — TraskBritt

(57) ABSTRACT

Methods and devices are disclosed for performing echo cancellation with a communication device for use by a hearing-impaired user. The communication device comprises communication elements, a memory device storing a plurality of sets of training parameters for an echo canceller, and a processor operably coupled with the communication elements and the memory device. The communication elements are configured to receive audio signals from a far end communication device, and to receive text captions corresponding to the audio signals from a relay service for display by the communication device during a call. Each set of training parameters corresponding to a different audio mode for the communication device. The processor is configured to execute an echo canceller by loading a first set of training parameters when a first audio mode is selected, and a second set of training parameters when a second audio mode is selected.

20 Claims, 3 Drawing Sheets

(56) References Cited

U.S. PATENT DOCUMENTS

| | | |
|---|---|---|
| 7,881,441 B2 | 2/2011 | Engelke et al. |
| 7,881,460 B2 | 2/2011 | Looney et al. |
| 8,054,966 B2 | 11/2011 | Stenmark et al. |
| 8,213,578 B2 | 7/2012 | Engleke et al. |
| 8,416,925 B2 | 4/2013 | Engelke et al. |
| 8,774,399 B2 | 7/2014 | Khanduri et al. |
| 8,811,602 B2 | 8/2014 | Khanduri et al. |
| 8,908,838 B2 | 12/2014 | Engelke et al. |
| 8,917,821 B2 | 12/2014 | Engelke et al. |
| 8,917,822 B2 | 12/2014 | Engelke et al. |
| 2004/0125944 A1* | 7/2004 | Popovic et al. .......... 379/406.01 |
| 2008/0187108 A1 | 8/2008 | Engelke et al. |
| 2008/0208538 A1* | 8/2008 | Visser et al. .................. 702/190 |
| 2011/0170672 A1 | 7/2011 | Engelke et al. |
| 2012/0250837 A1 | 10/2012 | Engleke et al. |
| 2015/0130887 A1* | 5/2015 | Thelin et al. ............... 348/14.03 |
| 2015/0163346 A1 | 6/2015 | Adams |

\* cited by examiner

DEVICE, SYSTEM, AND METHOD FOR PERFORMING ECHO CANCELLATION IN DIFFERENT MODES OF A COMMUNICATION DEVICE

FIELD

Embodiments of the application relate to telecommunications and more particularly to communication devices configured to assist hearing-impaired users in communicating with others. More particularly, the application relates to improvements to echo cancellation in such communication devices.

BACKGROUND

Hearing-impaired individuals may benefit from communication systems and devices configured to provide assistance in order to communicate with other individuals over a communication network. For example, relay services have been established to provide assistive services (e.g., text captions) to the hearing-impaired user communicating with a communication device (e.g., caption phone, caption enabled device, etc.) that is specifically configured to communicate with the relay service.

In particular, a relay service may be a telecommunication intermediary service, which is intended to permit a deaf or a hearing-impaired person to utilize a normal telephone network. The relay service may include an operator, referred to as a "call assistant," who serves as a human intermediary between the hearing-impaired user and a far-end user. During a captioning communication session, the call assistant may listen to the audio signal of a far-end user and "revoice" the words of the far-end user to a speech recognition computer program tuned to the voice of the call assistant. Text captions (also referred to as "captions") may be generated by the speech recognition computer as a transcription of the audio signal of the far-end user, and then transmitted to the communication device being used by the hearing-impaired user. The communication device may then display the text captions while the hearing-impaired user carries on a normal conversation with the far-end user. The text captions may allow the hearing-impaired user to supplement the voice received from the far-end and confirm his or her understanding of the words spoken by the far-end user.

During a communication session, the microphone of the communication device may experience echo (e.g., line echo, hybrid echo, acoustic echo). If the audio signal captured by the microphone and transmitted to the far-end user includes acoustic energy produced by the speaker, the far-end user may hear an "echo" of his or her own utterances. Conventional acoustic echo cancellation (AEC) techniques are designed to predict and remove the echo from an electrical signal generated by the microphone. In a communication device configured to assist hearing-impaired users, the issue of echo can present unique challenges due to the much louder volume levels for the audio produced by the speaker for the hearing-impaired user.

BRIEF SUMMARY

In some embodiments, the disclosure comprises a communication device. The communication device comprises communication elements, a memory device storing a plurality of sets of training parameters for an echo canceller, and a processor operably coupled with the communication elements and the memory device. The communication elements are configured to receive audio signals from a far end communication device during a call. Each set of training parameters corresponding to a different audio mode for the communication device. The processor is configured to execute an echo canceller by loading a first set of training parameters when a first audio mode is selected, and a second set of training parameters when a second audio mode is selected.

Also disclosed is a method of performing echo cancellation of an audio signal during a call. The method comprises determining a present audio mode from among a plurality of different audio modes for the communication device, loading a set of training parameters into an echo canceller corresponding to the present audio mode, performing echo cancellation on a near-end audio signal of the communication device while updating parameters of the echo canceller, and storing updated parameters as a new set of training parameters for the present audio mode responsive to switching to a new audio mode.

Also disclosed is a communication system for facilitating communication between a hearing-impaired user and a far-end user. The communication system comprises a relay service configured to provide text captions of a far-end audio signal associated with the far-end user, and a plurality of communication devices associated with different hearing-impaired user. Each communication device includes an electronic display configured to display the text captions during a call, a speakerphone, a handset, a memory device storing computer readable instructions and storing a set of training parameters for each of a speakerphone mode and a handset mode of operating the communication device, and a processor. The processor is configured to execute the computer readable instructions to control operations of the communication device, including executing an echo cancellation module configured to load the set of training parameters corresponding to the speakerphone mode when the communication device switches to the speakerphone mode, store a new set of training parameters in the memory device corresponding to the speakerphone mode when the communication device switches away from the speakerphone mode, load the set of training parameters corresponding to the handset mode when the communication device switches to the handset mode, and store a new set of training parameters in the memory device corresponding to the handset mode when the communication device switches away from the handset mode.

DETAILED DESCRIPTION

Figure 1:
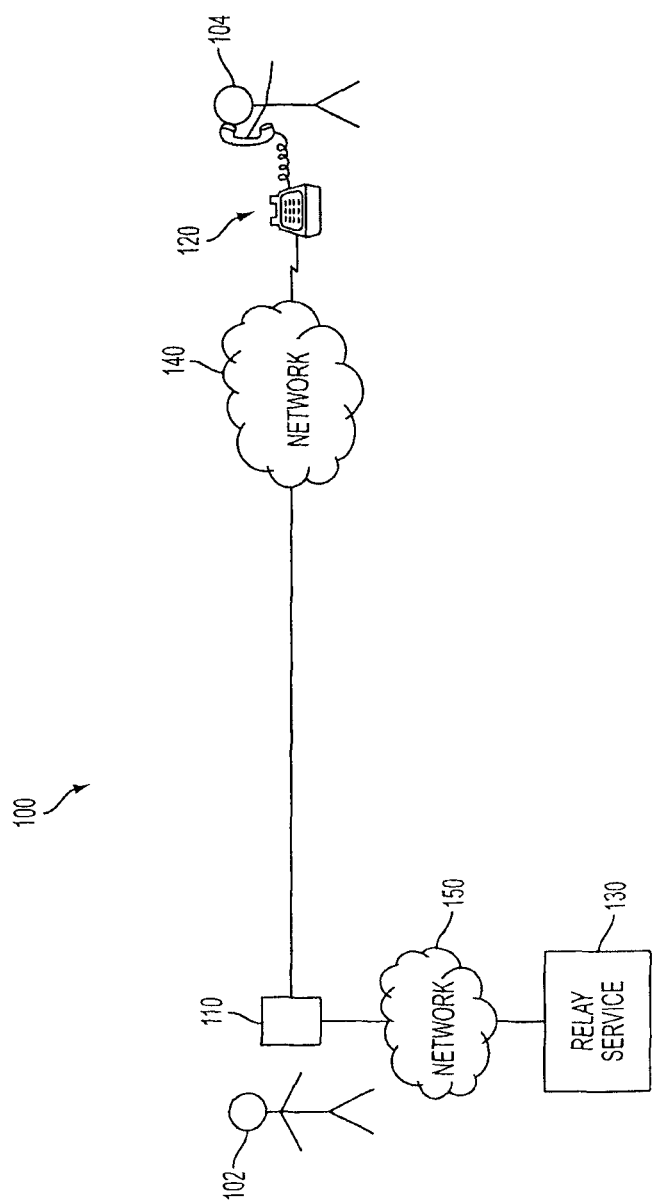
FIG. 1 illustrates a communication system configured to facilitate an assisted call between a hearing-impaired user and a far-end user.

In the following detailed description, reference is made to the accompanying drawings which form a part hereof, and in which is illustrated specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions, rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A processor herein may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a computer because, absent the disclosure, the computer would not be able to carry out the processes of the disclosure. The disclosure also provides meaningful limitations in one or more particular technical environments that go beyond an abstract idea. For example, embodiments of the disclosure provide improvements in the technical field of telecommunications. Embodiments include features that improve the functionality of the communication device such that new communication device and improved method for performing echo cancellation are described, particularly in a telecommunication system including a relay service for providing text captions to a caption-enabled communication device to assist hearing-impaired users who may use different audio modes with different speakers that operate at relatively high volume levels for the hearing-impaired users. As a result, the echo cancellation may be more tailored to individual audio modes, particularly when switching audio modes at the beginning of a call or during a call.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, interfacing with an operating system, etc. Furthermore, the methods disclosed herein may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, a "hearing-impaired user" may refer to a person with diminished hearing capabilities. Hearing-impaired users of caption-enabled communication device often have some level of hearing ability that has usually diminished over a period of time such that they can communicate by speaking, but that they often struggle in hearing and/or understanding the far-end user.

The term "call" as used herein refers to the communication session between the hearing-impaired user's communication device and the far-end user's communication device. The call may pass audio signals between the two parties. The term call is used in order to be more easily distinguishable from the captioning communication session. At times, the call may be referred to as incoming or outgoing from the perspective of the hearing-impaired user's communication device. Incoming and outgoing calls may refer to the period of time prior to when the call is "answered" by the other party to begin the communication of the audio signals therebetween.

The term "captioning communication session" as used herein refers to the communication session between the hearing-impaired user's communication device and the relay service. The captioning communication session may pass text captions from the relay service to the hearing-impaired user's communication device. In some embodiments, the captioning communication session may also include the hearing-impaired user's communication device transmitting the far-end user's audio signal to the relay service to generate the text captions.

The term "audio signal" (or voice signal) refers to the signal generated and transmitted by a communication device during a call. Most examples are provided from the perspective of a hearing-impaired user using a captioning communication device, such that the audio signal captured by that device is sometimes referred to as the "near-end audio signal," and the audio signal received to be reproduced by the speaker is sometimes referred to as the "far-end audio signal."

FIG. 1 illustrates a communication system 100 configured to facilitate an assisted call between a hearing-impaired user 102 and a far-end user 104. The communication system 100 may include a first communication device 110, a second communication device 120, and a relay service 130. The first communication device 110 and the second communication device 120 may be coupled together to facilitate communication therebetween via a first network 140. The first communication device 110 and the relay service 130 may be coupled together to facilitate communication therebetween via a second network 150. For example only, the first network 140 and the second network 150 may each be implemented according to the standards and bandwidth requirements of a communication network (e.g., Public Switch Telephone Network (PSTN), cellular network, Voice Over Internet Protocol (VOIP) networks, etc.). The use of the terms "network" or "communication network" as used herein contemplates networks that are compatible and configured to provide communications using analog and/or digital standards unless specifically stated otherwise. In some embodiments, the first network 140 and the second network 150 may be the same network (e.g., both connections may be Internet-based connections). Thus, discussion of the first network 140 and the second network 150 separately may be for convenience of discussing a particular connection between two or more devices. Of course, in some embodiments, the first network 140 and the second network 150 may be different networks. For example, the first communication device 110 and the second communication device 120 may communicate via a PSTN network connection, while the first communication device 110 and the second communication device 120 may communicate via an internet connection. Other variations and combinations of networks are also contemplated.

The first communication device 110 may include a device that is configured to assist the hearing-impaired user 102 in communicating with another individual (e.g., far-end user 104). In some embodiments, the first communication device 110 may include a caption-enabled communication device configured to receive and display text captions of at least a portion of the conversation. Thus, the hearing-impaired user 102 may be able to read the text captions of the words spoken by the far-end user 104 to supplement the far-end audio signal that is reproduced into sound by the first communication device 110. As a result, the hearing-impaired user 102 may have an improved experience in understanding the conversation. Such an embodiment may be useful for people whose hearing has been damaged or decreased over time (e.g., the elderly); such that they can still speak but have diminished hearing that makes it difficult to communicate. In some embodiments, the first communication device 110 may also be configured to receive and display video on an electronic display on the first communication device 110.

The second communication device 120 may comprise a conventional voice telephone (e.g., landline phone, cellular phone, smart phone, VoIP phone, etc.). As such, the far-end user 104 may interact in a conventional manner with the second communication device 120. In some embodiments, the second communication device 120 may be configured similarly as the first communication device (e.g., caption-enabled communication device). As a result, the second communication device 120 may likewise be operated by a hearing-impaired user. Thus, although facilitating communication between the hearing-impaired user 102 and the far-end user 104 is shown in FIG. 1 to imply that the far-end user 104 is a hearing-capable user, such a situation is shown only as an example. Other embodiments include both the first communication device 110 and the second communication device 120 coupled to the relay service 130 to facilitate the captioning services for each respective hearing-impaired user (not shown). In such a situation, each communication device 110, 120 may have its own communication session with the relay service 130.

The relay service 130 may be configured to provide interpretive services (e.g., captioning) to the hearing-impaired user 102. More specifically, a human "call assistant" within relay service 130 may be employed to facilitate an assisted call between a hearing-impaired user 102 and a far-end user 104. As discussed above, in some embodiments the relay service 130 may be configured to provide text captions of at least a portion of the conversation. In such an embodiment, the call assistant may listen to the voice signal received and re-voice the portion of the conversation into a microphone so that voice recognition software may generate the text captions that are transmitted to the first communication device 110. Thus, the relay service 130 may include one or more of an interne protocol captioned telephone service (IPCTS), captioned telephone service (CTS), or other telecommunications relay services (TRS).

FIG. 1 shows a configuration where the first communication device 110 acts as a router for the voice signal from the second communication device 120 to the relay service. In such an embodiment, the voice signal of the far-end user 104 may be transmitted from the second communication device 120 to the first communication device 110. The voice signal of the far-end user 104 may then be transmitted from the first communication device 110 to the relay service 130 for the text captions to be generated in a text captioning embodiment. The text captions may then be transmitted from the relay service 130 to the first communication device 110 to be displayed as text captions for the hearing-impaired user to read during the conversation. The call assistant may also monitor the text captions that are generated and transmitted to the first communication device 110 to identify any errors that may have been generated by the voice recognition software. The call assistant may correct such errors, such as described in U.S. Pat. No. 8,379,801, issued Feb. 19, 2013, entitled "Methods and Systems Related to Text Caption Error Correction," the disclosure of which is incorporated herein in its entirety by this reference. In some embodiments the relay service 130 may be configured to receive the voice signal from the second communication device 120 and route the voice signal to the first communication device 110. In some embodiments, another device may receive the voice signal from the second communication device 120 and split the voice signal to route to both the first communication device 110 and the relay service 130.

In addition, although FIG. 1 shows only two communication devices 110, 120, the communication system 100 may include more communication devices. It is contemplated that the communication system 100 may facilitate communication between any number and combinations of hearing-impaired users and far-end users. For example, in some embodiments two or more communication devices may be connected for facilitating communication between a hearing-impaired user and other hearing-impaired users and/or far-end users.

Embodiments of the disclosure improve upon the typical communication system by providing an improved method for echo cancellation within the first communication device 110. Depending on the mode (e.g., handset mode, speakerphone mode, headset mode, etc.) in which the first communication device 110 operates, different sets of training data may be used in the echo cancellation module.

Figure 2:
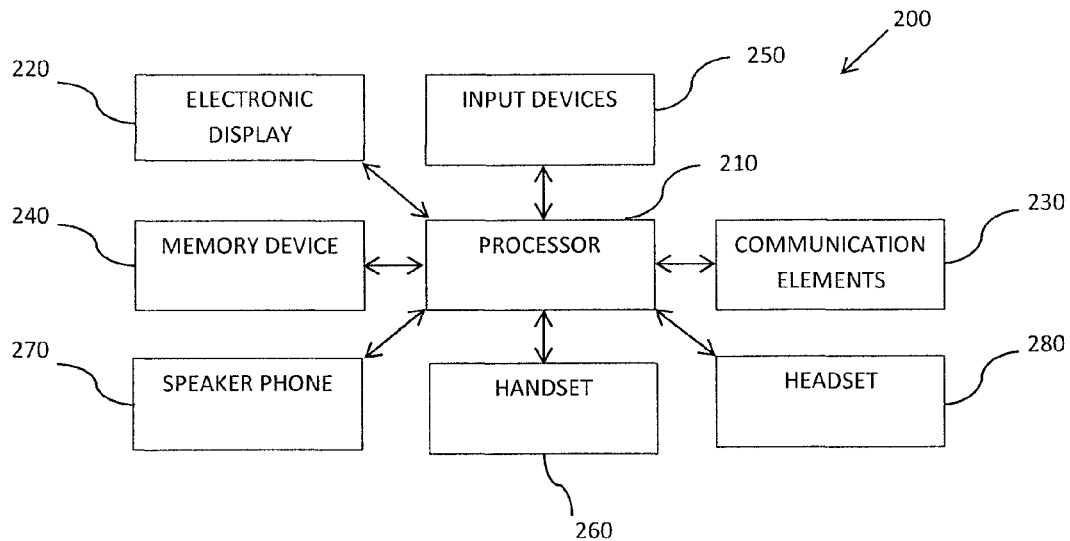
FIG. 2 is a simplified schematic block diagram of a communication device for use by a hearing-impaired user according to an embodiment of the disclosure.

FIG. 2 is a simplified schematic block diagram of a communication device 200 for use by a hearing-impaired user according to an embodiment of the disclosure. For example, the communication device 200 may be the first communication device 110 of FIG. 1. In particular, the communication device 200 may be configured to establish calls with other communication devices and captioning communication sessions with a relay service configured to assist the hearing-impaired user. The communication device 200 may be a caption enabled communication device, which may be implemented as a standalone device (e.g., a caption phone), or as implemented on another device (e.g., tablet computer, laptop computer, smart phone, etc.).

The communication device 200 may include a processor 210 operably coupled with an electronic display 220, communication elements 230, a memory device 240, and input devices 250. In some embodiments, the communication device 200 may include a camera for also participating in a video communication session. The processor 210 may coordinate the communication between the various devices as well as execute instructions stored in computer-readable media of the memory device 240. The processor 210 may be configured to execute a wide variety of operating systems and applications including the computing instructions. The memory device 240 may be used to hold computing instructions, data, and other information for performing a wide variety of tasks including performing embodiments disclosed herein. By way of example and not limitation, the memory device 240 may include Synchronous Random Access Memory (SRAM), Dynamic RAM (DRAM), Read-Only Memory (ROM), Flash memory, and the like. The memory device 240 may include volatile and non-volatile memory storage for the communication device 200.

The communication elements 230 may be configured to communicate with other devices or communication networks, including other communication devices and the relay service. As non-limiting examples, the communication elements 230 may include elements for communicating on wired and wireless communication media, such as for example, serial ports, parallel ports, Ethernet connections, universal serial bus (USB) connections IEEE 1394 ("firewire") connections, Bluetooth wireless connections, 802.1 a/b/g/n type wireless connections, and other suitable communication interfaces and protocols. The input devices 250 may include a numeric keypad, a keyboard, a touchscreen, a remote control, a mouse, buttons, other input devices, or combinations thereof.

The communication device 200 may further include a plurality of different components through which the user may communicate. In particular, the communication device 200 may include a handset 260 and a speakerphone 270. The handset 260 may be a handheld device having a microphone for the hearing-impaired user to speak into and capture the near end audio to transmit to the far-end communication device, as well as a speaker for the hearing-impaired user to hear the far-end audio produced by the speaker. The handset 260 may be coupled to the base unit of the communication device 200 through a cord or as a cordless handset. The speakerphone 270 may include a microphone and a speaker that are integrated into the base unit of the communication device 200. In some embodiments, the communication device 200 may also be compatible to communicate with a headset 280 having its own speaker and microphone. The headset 280 is typically worn by the hearing-impaired user to position the speaker close to the hearing-impaired user's ear and the microphone close to the hearing-impaired user's mouth. The headset 280 may be coupled to the base unit through a cord or as a cordless headset (e.g., via Bluetooth connection). In some embodiments, the headset 280 may not include its own microphone. In such embodiments, the microphone of the speakerphone 270 may be used.

The communication device 200 may be configured to be operated in one of a handset mode, a speakerphone mode, and a headset mode according to the desired method by the hearing-impaired user. Additional audio modes are contemplated as other devices may be used to provide a speaker and/or a microphone for the communication device 200. For example, a mobile device (e.g., smartphone, tablet, etc.) may be used to provide some of the functionality of the microphone and/or the speaker for the hearing-impaired user. In addition, different types of handsets or headsets may be employed such that the processor may determine that a specific handset or headset is in use and that a different set of training parameters may be saved for different types of handsets or headsets. For example, a hearing-impaired user may have different types of headsets that may be used by one or more different users of the communication device, such as a headset that may rest over the ear, be inserted into the ear, be connected to or integrated into eyewear or a hearing-aid, or another configuration. Each different type of headset may have different echo characteristics that may benefit from maintaining a separate set of training parameters.

The hearing-impaired user may select the desired operating mode prior to the call, and may even switch operating modes during the call. Each of the different modes creates a different acoustic environment for the communication device 200, which may cause different characteristics of the acoustic echo caused by the feedback (e.g., direct and/or indirect) from speaker to microphone. For example, the echo paths of the audio generated by the speakerphone 270 may be much different than the echo path of the audio generated by the handset 260. Likewise, if a headset 280 is used, the echo path may also be different than the other modes.

Because the communication device 200 is configured primarily for hearing-impaired users, the effects and differences in the echo characteristics may be even more different than the typical phone system. This is because the speakers used in the different components of the communication device 200 may include large gains in the amplifier, and produce louder volume levels than typical phones. For example, a speakerphone having an amplified volume for hearing-impaired users may be in a range of approximately 40 dB SPL to 50 dB SPL, or as much as 75 dB SPL or more in some embodiments measured at 0.5 meter from the speakerphone. A handset having an amplified volume for hearing-impaired users may be in a range of approximately 80 dB SPL to 100 dB SPL, or as much as 115 dB SPL or more in some embodiments measured at an ear reference point.

In order to reduce echo transmitted to the far-end device, an echo canceller is employed. In particular, the processor 210 is configured to execute an acoustic echo canceller (AEC) that processes the near-end audio signal generated by the microphone and filters out the portion of the near-end audio signal attributed to the echo from the environment from the speaker. An AEC often employs one or more adaptive filters that dynamically adjusts different parameters of the filter according to the changing environment to achieve the desired filtering of the echo signal. In particular, the parameters of the adaptive filter are adjusted for the adaptive filter to converge to approach zero error in the filter. An example of such an adaptive filter is described in U.S. patent Ser. No. 14/101,158, filed Dec. 9, 2013, and entitled "Methods and Devices for Updating an Adaptive Filter for Echo Cancellation," the entire disclosure of which is incorporated herein by this reference in its entirety. An additional example of an AEC include the different AEC products offered by Adaptive Digital Technologies, Inc. of Plymouth Meeting, Pa. Examples of parameters that may used by the AEC may include filter tap values, a filter step size, echo return loss estimate, echo return error estimate, filter coefficients used to adjust the adaptive filter, echo characteristics (e.g., frequency, bulk delay, gain, etc.), various energy statistics used to gauge overall filter health, and combinations thereof.

The processor 210 may be configured to determine which mode is in operation, and load a different set of training parameters of the AEC responsive to each particular mode. As used herein, "training parameters" may be the parameters used to set the AEC at the beginning of a call or when a the communication device 200 switches to a different mode during a call. For example, a first set of training parameters may be loaded into the AEC for a handset mode, a second set of training parameters may be loaded into the AEC for a speakerphone mode, and a third set of training parameters may be loaded into the AEC for a headset mode. The AEC may use the training parameters as a starting point for the call operating in the particular mode and adjust the dynamically adjust the parameters according. At the end of the operation of that particular mode (e.g., if the call is ended, if the user switches modes during the call, etc.), the processor 210 may save the ending state of the settings in the memory device 240 to be used as the training parameters for AEC the next time that the particular mode is used. As a result, the training parameters may be adjusted over time to be in a state that is effectively the last known good state for a particular mode. Each mode may have its own corresponding set of training data that is updated each time the mode is used. The result of such switching and updating training parameters may be an improvement at the beginning of a mode (e.g., beginning of a call or at the time of switching from another mode) as the starting point for the AEC may be more tailored to the particular use case and environment. These improvements may be even more apparent when generating the high volume levels involved in communication devices for hearing-impaired users. Embodiments of the disclosure may also include similar switching of modes and loading of training parameters in other echo cancellation applications, such as a hybrid echo canceller that uses an adaptive filter that may have different training parameters for different modes.

Figure 3:
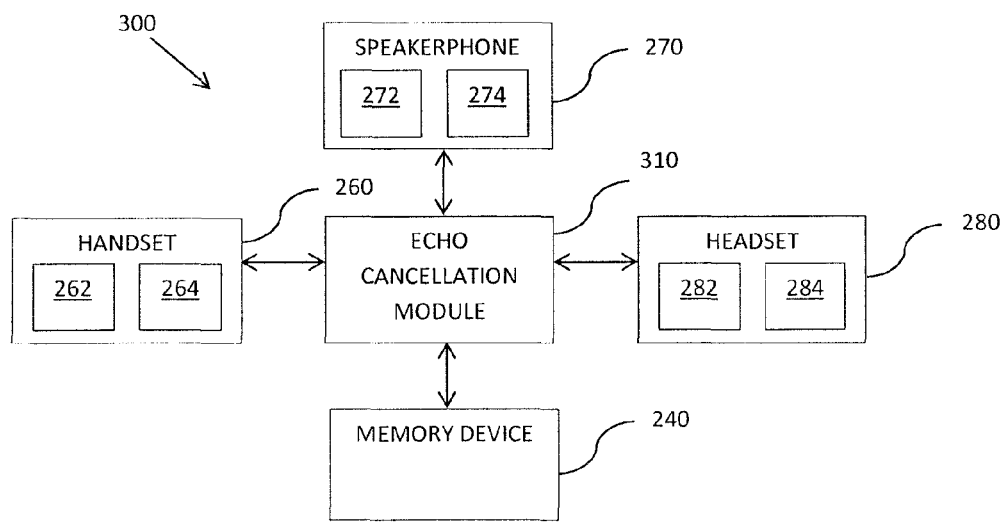
FIG. 3 is a simplified block diagram of a communication device according to an embodiment of the disclosure.

FIG. 3 is a simplified block diagram of a communication device according to an embodiment of the disclosure. The handset 260 includes a microphone 262 and a speaker 264. The speakerphone 270 includes a microphone 272 and a speaker 274. The headset 280 may include a microphone 282 and a speaker 284. Each of the handset 260, speakerphone 270, and headset 280 may communicate with an echo cancellation module 310 (executed by the processor 210 in FIG. 2). For example, the echo cancellation module 310 may receive the far-end audio signal (passed onto each of the speakers 264, 274, 284) as well as each of the near-end audio signals captured by each microphone 262, 272, 282. The source of the near-end audio signal used by the echo cancellation module 310 may depend on which microphone 262, 272, 282 is currently in use for a particular mode. In some embodiments, one microphone may be enabled while the others may be disabled. In some embodiments, each of the near-end audio signal lines may be received by a multiplexer that passes the appropriate near-end audio signal into the adaptive filter of the AEC according to the selected mode.

The memory device 240 may also be coupled to the echo cancellation module 310. The memory device 240 may have the different sets of training parameters stored therein corresponding to each of the modes. When a new mode begins, the corresponding set of training parameters may be loaded from the memory device 240 into the echo cancellation module 310, after which the parameters may be dynamically adjusted by the echo cancellation module 310 such that the parameters may be transformed into different values over time. At the end of the mode, the present values of the parameters may be stored in the memory device 240 as the last known good values of the parameters for that particular mode. As a result, the present values of the parameters may replace the previous values of the training parameters. Thus, the next time that the mode is used, an updated set of training parameters may be loaded into the AEC as its initial starting point.

Figure 4:
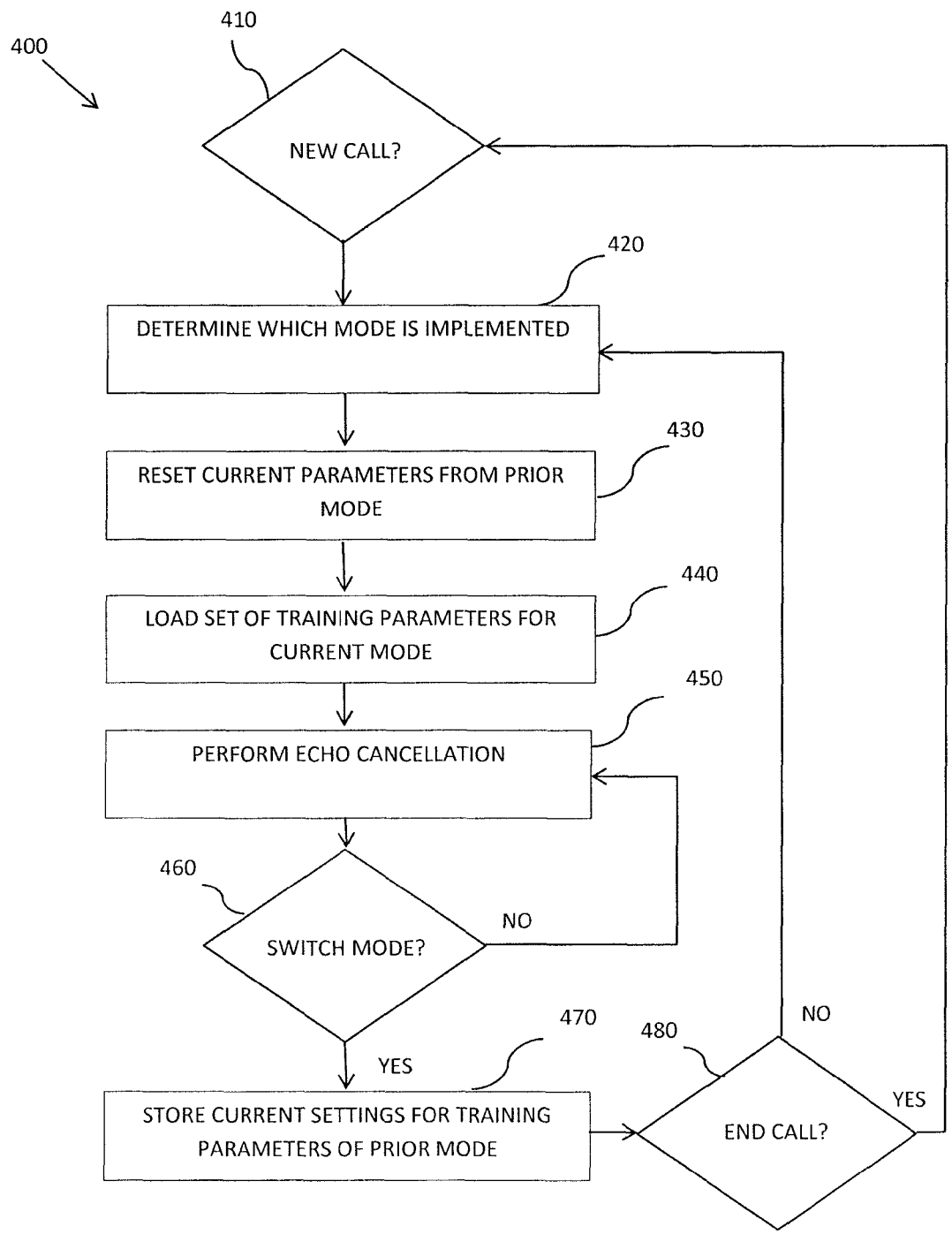
FIG. 4 is a flowchart illustrating a method for performing echo cancellation in an audio signal according to an embodiment of the disclosure.

FIG. 4 is a flowchart 400 illustrating a method for performing echo cancellation in an audio signal according to an embodiment of the disclosure. At operation 410, the processor may determine whether if a new call has been initiated, and further which audio mode is implemented at operation 420. For example, the current audio mode may be a handset mode, a speaker mode, a headset mode, or other mode as desired. At operation 430, the current parameters of the AEC from the prior mode may be reset. At operation 440, the set of training parameters for the current mode may be loaded into the echo canceller as its starting point for the echo cancellation operation. The training parameters may be the last known good position of the parameters corresponding to the prior use of the communication device in the current mode. At operation 450, the processor may perform the echo cancellation on the near-end audio signal prior to being sent to the far-end communication device. As a result, the echo captured from the output of the speaker may be reduced as the echo cancellation operation adapts its parameters to converge toward reducing the error of the echo canceller. The echo cancellation may continue to be performed as long as the mode does not switch (e.g., based on the call ending and/or the user actively switching the mode during the call).

At operation 460, if the mode has been switched, the processor may store the current settings of the echo canceller into a memory device. The current settings may replace the stored training parameters for the prior mode. For example, if the mode switches from handset mode to speakerphone mode, the current settings of the echo canceller may replace the stored training parameters of the handset mode. If the mode switch occurred due to the call being ended, at operation 480, the processor may end the call and await a new call. Otherwise, if the mode switch occurred while the call is to continue, the processor may return to determining the new mode and loading the set of training parameters for the new mode before performing echo cancellation.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventor.

What is claimed is:

1. A communication device, comprising:
    communication elements configured to receive audio signals from a far end communication device during a call;
    a memory device storing a plurality of different sets of echo cancellation training parameters for an adaptive filter that performs echo subtraction for an echo canceller, each set of echo cancellation training parameters corresponding to a different audio mode for the communication device; and
    a processor operably coupled with the communication elements and the memory device, the processor configured to execute the echo canceller by switching between loading a first set of echo cancellation training parameters responsive to a first audio mode being selected, and a second set of echo cancellation training parameters responsive to a second audio mode being selected, wherein the echo canceller is configured to:
        dynamically adjust the echo cancellation training parameters during echo cancellation to have different values than the echo cancellation training parameters initially loaded into the echo canceller; and
    store the different values as updated echo cancellation training parameters for the corresponding set of echo cancellation training parameters of the selected audio mode responsive to exiting the selected audio mode.

2. The communication device of claim 1, wherein the first audio mode is a handset mode corresponding to a handset being used, and the second audio mode is a speakerphone mode corresponding to a speakerphone being used.

3. The communication device of claim 2, wherein the processor is further configured to load a third set of echo cancellation training parameters when a third audio mode is selected.

4. The communication device of claim 3, wherein the third audio mode is a headset mode corresponding to a headset being used.

5. The communication device of claim 1, wherein the echo canceller is an acoustic echo canceller (AEC).

6. A method of performing echo cancellation of an audio signal during a call of a communication device, the method comprising:
    determining a first audio mode for the communication device;
    loading a first set of echo cancellation training parameters into an adaptive filter that performs echo subtraction for an echo canceller, the first set of echo cancellation training parameters corresponding to the first audio mode;
    performing echo cancellation on a near-end audio signal of the communication device while updating parameters of the adaptive filter of the echo canceller from the first set of echo cancellation training parameters;
    exiting the first audio mode;
    storing the updated parameters for the first set of echo cancellation training parameters for the first audio mode responsive to exiting the first audio mode;
    switching to a second audio mode;
    loading a second set of echo cancellation training parameters into the adaptive filter, the second set of echo cancellation training parameters corresponding to the second audio mode; and
    performing echo cancellation on the near-end audio signal of the communication device while updating parameters of the adaptive filter of the echo canceller from the second set of echo cancellation training parameters.

7. The method of claim 6, wherein exiting the first audio mode is responsive to ending the call, and switching to the second audio mode occurs during a different call.

8. The method of claim 6, wherein exiting the first audio mode and switching to the second audio mode is responsive to a user selecting the second audio mode during the same call.

9. The method of claim 6, further comprising:
    exiting the second audio mode;
    storing the updated parameters for the second set of echo cancellation training parameters for the second audio mode responsive to exiting the second audio mode;
    switching to a third audio mode;
    loading a third set of echo cancellation training parameters into the adaptive filter, the third set of echo cancellation training parameters corresponding to the third audio mode; and
    performing echo cancellation on the near-end audio signal of the communication device while updating parameters of the adaptive filter of the echo canceller from the third set of echo cancellation training parameters.

10. The method of claim 6, further comprising resetting the adaptive filter of the echo canceller prior to loading the second set of echo cancellation training parameters into the adaptive filter of the echo canceller.

11. The method of claim 6, wherein the first audio mode and the second audio mode are different audio modes selected from the group consisting of a handset mode, a speakerphone mode, and a headset mode.

12. The method of claim 6, wherein the first set of echo cancellation training parameters are a set of last known good parameters from a prior use of the communication device in the first audio mode.

13. A communication system for facilitating communication between a hearing-impaired user and a far-end user, the communication system comprising:
    a communication service configured to provide text captions of a far-end audio signal associated with the far-end user; and
    a plurality of communication devices associated with different hearing-impaired users, each communication device including:
        an electronic display configured to display the text captions during a call;
        a speakerphone;
        a handset;
        a memory device storing computer readable instructions and storing a different set of echo cancellation training parameters for each of a speakerphone mode and a handset mode of operating the communication device; and
        a processor configured to execute the computer readable instructions to control operations of the communication device, including executing an echo cancellation module configured to:
            load the set of echo cancellation training parameters corresponding to the speakerphone mode into an adaptive filter that performs echo subtraction for an echo canceller responsive to the communication device switching to the speakerphone mode;
            load the set of echo cancellation training parameters corresponding to the handset mode into the adaptive filter responsive to the communication device switching to the handset mode;
            store an updated set of echo cancellation training parameters in the memory device for the first set of echo cancellation training parameters responsive to the communication device exiting the speakerphone mode; and store an updated set of echo cancellation training parameters in the memory device for the second set of echo cancellation training parameters responsive to the communication device exiting the handset mode.

14. The communication system of claim 13, wherein the memory stores a third set of echo cancellation training parameters for a headset mode, and wherein the echo cancellation module is configured to:

load the third set of echo cancellation training parameters corresponding to the headset mode responsive to the communication switching to the headset mode; and store a set of echo cancellation training parameters in the memory device for the third set of echo cancellation training parameters responsive to the communication device exiting the third mode.

15. The communication system of claim 13, wherein the speakerphone is integrally formed with a body of the communication device.

16. The communication device of claim 15, wherein the handset is coupled with the body of the communication device through one of a cord or a cordless configuration.

17. The communication device of claim 1, wherein the different values stored for each of the different audio modes correspond to a last known good state for each of the different audio modes.

18. The communication device of claim 1, wherein the echo canceller is configured to store the different values as updated echo cancellation training parameters by replacing the echo cancellation training parameters prior to switching audio modes.

19. The method of claim 1, wherein the processor is configured to execute the echo canceller to between loading the first set of echo cancellation training parameters and the second set of echo cancellation training parameters during the same call.

20. The method of claim 8, further comprising:
exiting the second audio mode;
storing the updated parameters for the second set of echo cancellation training parameters for the second audio mode responsive to exiting the second audio mode;
switching back to the first audio mode;
loading the updated first set of echo cancellation training parameters into the adaptive filter; and
performing echo cancellation on the near-end audio signal of the communication device while updating parameters of the adaptive filter of the echo canceller from the updated first set of echo cancellation training parameters.

* * * * *